United States Patent
Kurashina

(10) Patent No.: US 10,023,130 B2
(45) Date of Patent: Jul. 17, 2018

(54) FUSE-PULLER HOLDING STRUCTURE

(71) Applicant: TOYOTA JIDOSHA KABUSHIKI KAISHA, Toyota-shi, Aichi-ken (JP)

(72) Inventor: Atsushi Kurashina, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 147 days.

(21) Appl. No.: 15/148,028

(22) Filed: May 6, 2016

(65) Prior Publication Data
US 2016/0347260 A1 Dec. 1, 2016

(30) Foreign Application Priority Data

May 28, 2015 (JP) .................. 2015-108991

(51) Int. Cl.
*B60R 11/06* (2006.01)
*H01H 85/02* (2006.01)
*B60R 16/023* (2006.01)
*B60R 11/00* (2006.01)

(52) U.S. Cl.
CPC ......... *B60R 11/06* (2013.01); *H01H 85/0208* (2013.01); *B60R 16/0239* (2013.01); *B60R 2011/0003* (2013.01)

(58) Field of Classification Search
CPC ............... H01H 85/0208; B60R 2011/0003
USPC ........................................... 81/3.8
See application file for complete search history.

(56) References Cited

U.S. PATENT DOCUMENTS 7,384,086 B2 * 6/2008 Lukaszynski ...... H01H 85/0208
29/278
2017/0066113 A1 * 3/2017 Kawada .................. B25B 9/02

FOREIGN PATENT DOCUMENTS

| JP | S63-090458 A | 4/1988 |
| JP | H03-55636 U | 5/1991 |
| JP | H08-315715 A | 11/1996 |
| JP | H11-185594 A | 7/1999 |
| JP | 2002-044833 A | 2/2002 |
| JP | 2003-317603 A | 11/2003 |

* cited by examiner

*Primary Examiner* — Hadi Shakeri
(74) *Attorney, Agent, or Firm* — Oliff PLC

(57) ABSTRACT

A fuse-puller holding structure, in which a fuse puller used for detachment of a fuse is held by a fuse-puller holding object provided in a vehicle, includes: an engagement portion and a rib portion. The rib portion is provided at a position opposite to a predetermined position of the fuse puller across a support such that the rib portion serves as a fulcrum with the engagement portion as a point of load at the time when the predetermined position of the fuse puller is assumed a point of effort, and the rib portion being provided at a position at which a distance between the point of load and the rib portion is not more than a distance between the point of effort and the point of load. The fuse puller is held by the support so as to be distanced from the mounting surface of the fuse-puller holding object.

7 Claims, 3 Drawing Sheets

FUSE-PULLER HOLDING STRUCTURE

INCORPORATION BY REFERENCE

The disclosure of Japanese Patent Application No. 2015-108991 filed on May 28, 2015 including the specification, drawings and abstract is incorporated herein by reference in its entirety.

BACKGROUND OF THE INVENTION

1. Field of the Invention

The invention relates to a fuse-puller holding structure configured to hold a fuse puller by a projection or the like inside an electrical connection box, for example. The fuse puller is used to detach a fuse attached to the electric connection box or the like of an automobile.

2. Description of Related Art

A blade-type fuse is used for an electrical connection box such as a fuse box of an automobile. Particularly, the blade-type fuse used for the automobile is provided in a narrow space, so it is not easy to detach the fuse by putting a hand into such a narrow space at the time of replacement or the like of the fuse. In view of this, inside the electrical connection box, a fuse puller, which is a tool used to detach the fuse, is often held by a projection or the like. An example of a holding structure for the fuse puller is described, for example, in Japanese Utility Model Application Publication No. 03-55636 (JP 03-55636 U).

A fuse-puller holding structure described in JP 03-55636 U has a structure for holding a fuse puller at two parts in its longitudinal direction. First, the fuse puller is configured such that two clip pieces are connected by a curved spring connection portion provided on a rear side of an intermediate part of the fuse puller, and includes a mounting hole (a round-hole) formed between the two clip pieces along the curve of the spring connection portion, a hook portion that sandwiches a head of a blade-type fuse provided on a tip side, and a stopper portion provided on a rear side. A holding portion for such a fuse puller includes: a tip-side projection that holds two clip pieces of the hook portion of the fuse puller so as to sandwich them from outside; a rear-side projection that holds two clip pieces of the stopper portion of the fuse puller so as to expand them from inside; and a support (a columnar projection) inserted into the mounting hole of the fuse puller.

According to the fuse-puller holding structure described in JP 03-55636 U, the fuse puller is held with a predetermined strength due to the two clip pieces of the hook portion being sandwiched from outside, due to the two clip pieces of the stopper portion being expanded from inside, and due to a falling-off prevention operation by the support with respect to the mounting hole between the two clip pieces.

In the meantime, it is necessary for the holding portion of the fuse-puller holding structure to stably hold the fuse puller for a long period while the holding portion is affected by shaking of an automobile. The fuse puller is often made from a resin member. On this account, the support is provided with a falling-off prevention engagement portion that locks the fuse puller with a high retentive force so as to secure a stronger falling-off prevention operation (retentive force) in the engagement portion. However, if such a falling-off prevention operation is too strong, a strong force is required to detach the fuse puller, which impairs its convenience. For example, FIGS. 5, 6 illustrate a holding structure in which an electrical connection box 20 is provided with a support 110 and a tip-end support portion 40. As illustrated in FIG. 5, when a force is applied to detach a fuse puller 100 held by the support 110, if a lifted part of the fuse puller 100 is caught by an engagement portion 120, it is difficult to smoothly detach the fuse puller 100. Further, as illustrated in FIG. 6, if the support 110 is largely inclined because the lifted part of the fuse puller 100 cannot go over the engagement portion 120, a large load is applied to the support 110 itself, which may cause deformation, breakage, or the like in its root portion 130.

SUMMARY OF THE INVENTION

The present invention provides a fuse-puller holding structure that can hold a fuse puller with an appropriate strength and also enables a smooth pulling-out operation of the fuse puller from a holding portion.

A fuse-puller holding structure according to a first aspect in which a fuse puller used for detachment of a fuse is held by a fuse-puller holding object provided in a vehicle includes: an engagement portion provided in a tip end of a support provided on a mounting surface of the fuse-puller holding object, the tip end being provided on a side opposite to a base end of the support, the base end being provided on a mounting-surface side, the engagement portion being configured to be engaged with the fuse puller in a state where the fuse puller is attached to the fuse-puller holding object, so as to restrain the fuse puller from detaching from the fuse-puller holding object; and a rib portion projecting from a part of the mounting surface of the fuse-puller holding object, the part of the mounting surface being a surface opposed to the fuse puller and the part of the mounting surface being a surface distanced from the base end of the support, the rib portion being provided at a position opposite to a predetermined position of the fuse puller across the support such that the rib portion serves as a fulcrum and the engagement portion serves as a point of load at a time when the predetermined position of the fuse puller serves as a point of effort, and the rib portion being provided at a position at which a distance between the point of load and the rib portion is not more than a distance between the point of effort and the point of load. The fuse puller is held by the support so as to be distanced from the mounting surface of the fuse-puller holding object.

Generally, at the time when a fuse puller attached to a support is detached, a side thereof extending long from the support is raised. However, when the fuse puller is raised at a position distanced from the support, the support may be inclined to be deformed or broken, as described above. With the configuration of the above aspect, even if the fuse puller is raised at the predetermined position distanced from the support, the engagement portion serves as the point of load along with the raising, and a part inclined downward abuts with the rib portion serving as the fulcrum. Hereby, the inclination of the support is restrained. Further, since the point of effort and the fulcrum are placed so as to sandwich the point of load, the law of the lever is applied. Because of this, if a distance between the fulcrum and the point of load is set to be not more than a distance between the point of load and the point of effort, the fuse puller is disengaged with a force smaller than the engagement between the engagement portion as the point of load and the fuse puller. Hereby, the fuse puller can be held with an appropriate strength and also can be smoothly pulled out from the support. Note that, in a state where the fuse puller is attached to the fuse-puller holding object, the rib portion may abut with the fuse puller or may not abut with the fuse puller.

In the above aspect, the fuse puller may be configured such that an end portion to be engaged with the fuse is a tip end and an end portion opposite to the tip end is a rear end, and rib portion may be provided at a position opposed to a position of the fuse puller, the position of the fuse puller being closer to the rear end of the fuse puller than the support is.

According to the above aspect, when the tip end of the fuse puller is raised, the rib portion restrains the rear end from being lowered with the support as a fulcrum, so that inclination of the fuse puller and the support is restrained.

In the above aspect, the engagement portion may be provided in the tip end of the support so as to be extended in parallel with a direction from a tip-end side of the fuse puller toward a rear-end side of the fuse puller. According to the above configuration, when the fuse puller is raised, a force is sequentially applied to the engagement portion from the tip-end side toward the rear-end side intensively, thereby resulting in that detachment of the engagement portion is performed more smoothly.

In the above aspect, the fuse-puller holding object may be an electrical connection box made of resin, and the support and the rib portion may be formed integrally with the electrical connection box. With such a configuration, by placing the fuse puller in the electrical connection box in which a fuse is used, usableness is increased. Further, since the support and the rib portion are formed integrally the with electrical connection box, the support and the rib portion can be provided easily with a low cost. In the meantime, if the support is broken at the time of detachment of the fuse puller, its replacement is difficult. In this regard, according to the above configuration, the breakage of the support itself can be restrained.

In the above aspect, the rib portion may be provided so as to abut with the fuse puller attached to the support. With such a configuration, a stability of holding of the fuse puller attached to the support in the fuse-puller holding object provided in the vehicle can be further improved.

In the above aspect, the engagement portion may be configured such that an engagement overhanging part from the support is formed in a curve profile. With such a configuration, since the engagement portion is formed in a curve profile in a direction in which the fuse puller is attached and detached, engagement and disengagement of the fuse puller with respect to the engagement portion can be smoothly performed.

In the above aspect, the support may be formed in a generally cylindrical shape extended in an up-down direction, which is a vertical direction with respect to the mounting surface; the support may have a cut extending in the up-down direction so as to divide the support into a first mounting portion and a second mounting portion along a direction from a tip-end support portion side toward its opposite side, the tip-end support portion being provided on the mounting surface of the fuse-puller holding object so as to be placed at a position at which the tip-end side of the fuse puller is placed; and the cut may be provided consecutively from the base end of the support to the tip end of the support in the up-down direction.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
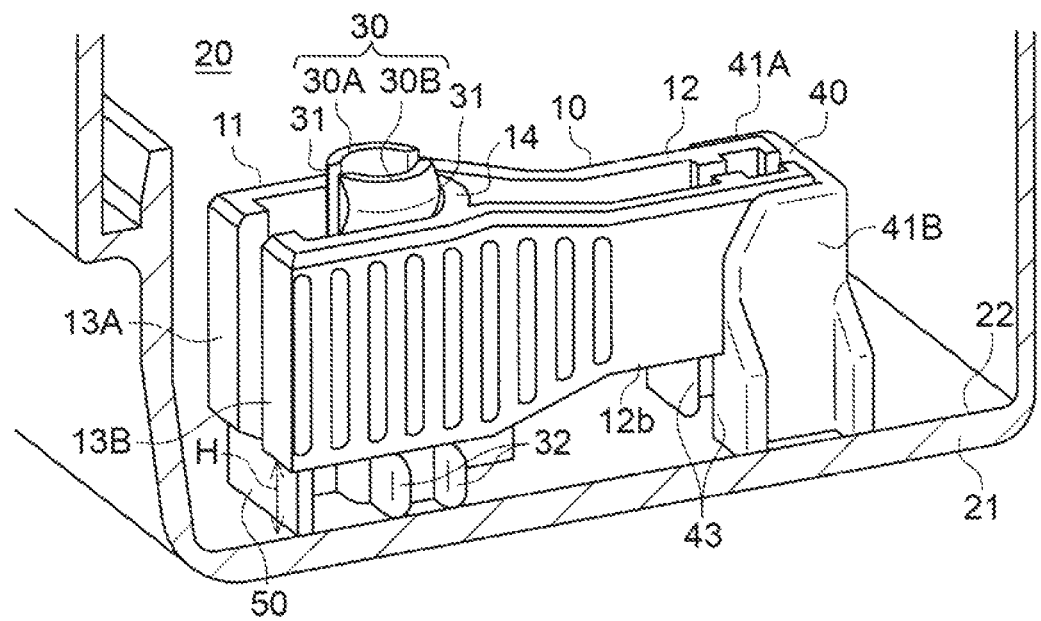
FIG. 1 is a perspective view illustrating a perspective configuration according to one embodiment that embodies a fuse-puller holding structure.

Referring now to FIGS. 1 to 4, one embodiment that embodies a fuse-puller holding structure is described. The fuse puller 10 is a tool for detaching a blade-type fuse, and as illustrated in FIG. 1, the fuse puller 10 is provided detachably inside an electrical connection box 20 of an automobile as a holding object. The electrical connection box 20 receives a device that performs at least one of power supply and signal transmission with respect to an electronic device carried in the automobile, and is, for example, a fuse box, a junction box, a relay box, or the like. The electrical connection box 20 is made of resin, and includes a body portion (not shown) in which the device is placed, and a cover portion 21 that covers an opening of the body portion. In the electrical connection box 20, a fuse-puller holding portion is provided in the cover portion 21. The cover portion 21 is provided with a support 30 and a tip-end support portion 40 extended in a vertical direction with respect to a mounting surface 22, which is an inner surface. The fuse puller 10 is held by the support 30 and the tip-end support portion 40. Since the cover portion 21 detached from the body portion is high in a degree of freedom of arrangement, the fuse puller 10 attached to the cover portion 21 is also high in a degree of freedom of its detachment.

Figure 3A:
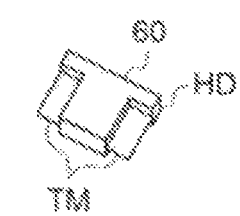
FIG. 3A is a perspective view illustrating a perspective structure of a fuse to be detached by a fuse puller and illustrates a short fuse.
Figure 3B:
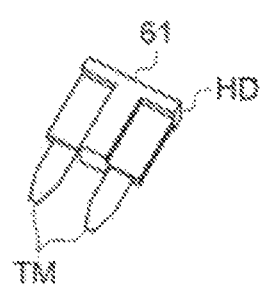
FIG. 3B is a perspective view illustrating a perspective structure of a fuse to be detached by the fuse puller and illustrates a small and flat fuse.
Figure 3C:
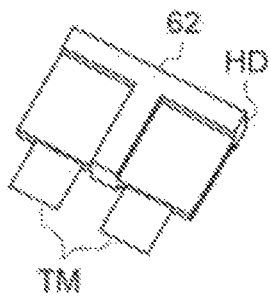
FIG. 3C is a perspective view illustrating a perspective structure of a fuse to be detached by the fuse puller and illustrates a flat fuse.

Further, FIGS. 3A, 3B, 3C illustrate a short fuse 60, a small and flat fuse 61, and a flat fuse 62, respectively, as examples of the blade-type fuse. A detachment object of the fuse puller 10 is at least one of the short fuse 60, the small and flat fuse 61, and the flat fuse 62. The fuse 60, 61, 62 includes a pair of terminals TM connected to an electric circuit, and a head HD having a projecting edge portion. The head HD is a part with which a tip end 12 of the fuse puller 10 is engaged at the time when the fuse 60, 61, 62 is detached from a fuse holder (not shown) of the body portion.

As illustrated in FIG. 1, the fuse puller 10 is held by the fuse-puller holding portion so as to be distanced from the mounting surface 22 of the cover portion 21 of the electrical connection box 20 by a predetermined distance H due to the support 30.

The fuse puller 10 is made of resin, and is used to detach the fuse attached to the fuse holder of the body portion of the electrical connection box 20 such that the fuse is pulled out from the fuse holder. The fuse puller 10 includes the tip end 12, which is an end portion to be engaged with the head HD of the fuse, and a rear end 11, which is an end portion opposite to the tip end 12 and serves as a handle side at the time of detaching the fuse. Further, the fuse puller 10 includes two clip pieces 13A, 13B extending in its longitudinal direction, which is a direction from the tip end 12 toward the rear end 11. The clip pieces 13A, 13B are connected by a connection portion 14 on a rear-end-11 side in the middle of the clip pieces 13A, 13B in the longitudinal direction.

Figure 2:
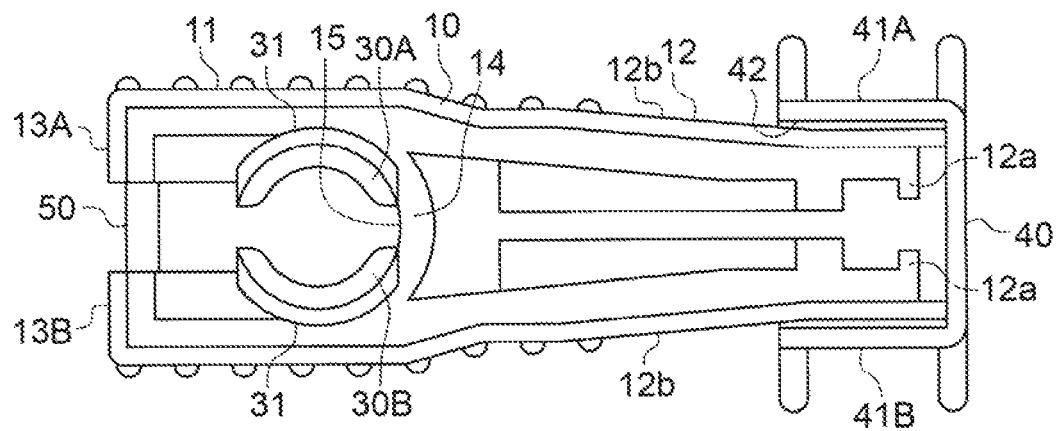
FIG. 2 is a top view illustrating a top-face structure of the fuse-puller holding structure in the embodiment.

A top-face structure is illustrated in FIG. 2. The connection portion 14 maintains a predetermined gap between the two clip pieces 13A, 13B at the tip end 12 and at the rear end 11. The connection portion 14 is also made of resin integrated with the fuse puller 10, and is formed in an elastically deformable shape. Hereby, the two clip pieces 13A, 13B can rotate only by a limited angle around the connection portion 14. That is, if the gap between the two clip pieces 13A, 13B is narrowed at the tip end 12, the gap therebetween at the rear end 11 is widened. On the other hand, if the gap between the two clip pieces 13A, 13B is narrowed at the rear end 11, the gap therebetween at the tip end 12 is widened.

The tip end 12 includes claw portions 12a at respective tip ends of the clip pieces 13A, 13B, and the claw portions 12a are configured to be engaged with the head HD of the fuse. In the tip end 12, respective claw portions 12a of the clip pieces 13A, 13B are placed so as to face each other. Further, in the tip end 12, a gap between two claw portions 12a that face each other is set to be a gap smaller than a distance corresponding to a thickness of the head HD of the fuse. When the tip end 12 is pressed against the head HD, the tip end 12 is widened and passes through the projecting edge portion of the head HD of the fuse, so that the claw portions 12a are engaged with the head HD of the fuse. Further, the tip end 12 has a predetermined position 12b that serves as a point of effort to which a detachment force is applied at the time when the fuse puller 10 is detached from the fuse-puller holding portion.

The rear end 11 has a predetermined gap between the two clip pieces 13A, 13B, and a gap to be widened in the tip end 12 is determined according to the gap in the rear end 11. Accordingly, for example, the gap between the two clip pieces 13A, 13B at the rear end 11 is set to a gap that can widen the tip end 12 to a width that can release the fuse engaged with the claw portions 12a. Further, the rear end 11 has a position corresponding to a fulcrum at the time when the fuse puller 10 is detached from the fuse-puller holding portion.

A mounting hole 15 is provided on a rear-end-11 side of the connection portion 14 and between the two clip pieces 13A, 13B. The mounting hole 15 is a generally cylindrical through-hole into which the support 30 provided on the mounting surface 22 of the electrical connection box 20 can be inserted. When the support 30 is inserted into the mounting hole 15, the fuse puller 10 is held with the predetermined distance H from the mounting surface 22 of the electrical connection box 20 as illustrated in FIG. 1. Further, in a top view (FIG. 2) in which the support 30 is viewed from the top, the mounting hole 15 has an arch shape in which its rear-end-11 side is opened, and in a side face viewed in a direction where the support 30 is extended, the mounting hole 15 has a cylindrical shape in which its rear-end-11 side is opened.

The fuse-puller holding portion holds the fuse puller 10 in the electrical connection box 20 with a strength and a form that prevents falling and occurrence of noise due to shaking of a vehicle. Further, the fuse-puller holding portion holds the fuse puller 10 such that the two clip pieces 13A, 13B face each other with the support 30 being sandwiched therebetween. Further, in a state where the fuse puller 10 is held by the fuse-puller holding portion, the fuse puller 10 is configured such that a side opposed to the mounting surface 22 is a lower side and a side opposite to the lower side is an upper side.

As described above, the fuse-puller holding portion is configured such that the mounting hole 15 of the fuse puller 10 is passed through the support 30 in a holding manner, and the tip end 12 of the fuse puller 10 is held by the tip-end support portion 40. The tip-end support portion 40 holds the tip end 12 such that the tip end 12 is placed between right and left wall portions 41A, 41B, so that the gap in the tip end 12 of the fuse puller 10 is maintained to be a predetermined gap. Further, the tip-end support portion 40 has an opening 42 provided on a support-30 side thereof and configured such that the tip end 12 of the fuse puller 10 is inserted therein, and includes support walls 43 (FIG. 1) provided on a lower side of the opening 42 so as to narrow its opening width. The support walls 43 restrict the fuse puller 10 from moving toward the mounting surface 22, and when the support walls 43 abut with a lower side of the fuse puller 10, the support walls 43 maintain a holding height of the fuse puller 10 to be the predetermined distance H from the mounting surface 22. Since the fuse puller 10 is held with the predetermined distance H from the mounting surface 22 of the electrical connection box 20, even if finger tips are restricted by the mounting surface 22 at the time of detachment, the fuse puller 10 is maintained at a position where the fuse puller 10 can be easily picked up by the finger tips. Further, the tip-end support portion 40 holds the tip end 12 so as not to cause any gaps on its right and left sides and on its lower side, so that vibration sound of the tip end 12 due to shaking of the vehicle is restrained.

The support 30 is formed in a shape that allows the mounting hole 15 of the fuse puller 10 to be pass therethrough. The support 30 is formed in a generally cylindrical shape extended in an up-down direction, which is a vertical direction with respect to the mounting surface 22. Further, the support 30 has a cut that divides the support 30 into two along a direction from a tip-end-support-portion-40 side toward its opposite side such that the cut extends in the up-down direction. The cut is provided consecutively from a base end of the support 30 to its tip end in the up-down direction. That is, the support 30 is constituted by a first attachment piece 30A placed on a right side when the support 30 is viewed from the tip-end support portion 40, and a second attachment piece 30B placed on a left side when the support 30 is viewed from the same side. Accordingly, when the fuse puller 10 is attached to the support 30, the first attachment piece 30A abuts with the clip piece 13A on the right side, and the second attachment piece 30B abuts with the clip piece 13B on the left side. A predetermined gap due to the cut is provided between the first attachment piece 30A and the second attachment piece 30B. Due to the gap, the first attachment piece 30A can be inclined toward the left side and the second attachment piece 30B can be inclined toward the right side in an upper part of the support 30. When at least one of the first attachment piece 30A and the second attachment piece 30B is inclined in the upper part of the support 30, an outer peripheral shape of the support 30 is reduced.

The support 30 includes a support portion 32 that projects outward from the outer peripheral shape of the support 30 with a predetermined length in an extending direction from the mounting surface 22. When the support portion 32 abuts with a lower side of the fuse puller 10, the support portion 32 also restricts a downward movement of the fuse puller 10, so as to define the holding height of the fuse puller 10 to the predetermined distance H from the mounting surface 22. As described above, by defining the holding height of the fuse puller 10 to the predetermined distance H, the fuse puller 10 is held at a position where the fuse puller 10 can be easily picked up by the finger tips. Further, the support 30 also holds the fuse puller 10 so that no gap is formed with respect to the mounting hole 15, thereby restraining vibration sound of the fuse puller 10 itself due to shaking of the vehicle.

Figure 4:
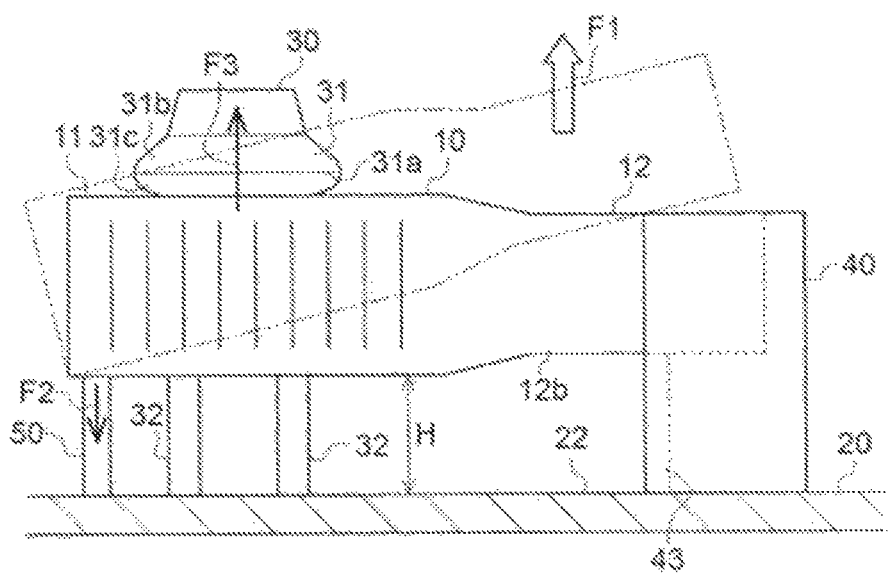
FIG. 4 is a side view illustrating an operation of the fuse-puller holding structure in the embodiment.

In the meantime, as illustrated in FIG. 4, a tip side of the support 30 includes an engagement portion 31 overhanging outward from a side face of the support 30. The engagement portion 31 is extended on the side face of the support 30 so as to be generally parallel with an upper side of the fuse puller 10 and to be arranged in parallel with a direction from a tip-end side toward a rear-end side. Note that, in FIG. 4, a shape of the engagement portion 31 is exaggerated for convenience of the description. As illustrated in the above figure, the engagement portion 31 has an outer peripheral shape larger than a shape of an opening of the mounting hole 15 of the fuse puller 10. Roughly speaking, an outside diameter of an arc of the engagement portion 31 is larger than an inside diameter of an arc of the mounting hole 15. Further, a length of the support 30 from the support portion 32 to the engagement portion 31 is the same as or slightly shorter than a length of the mounting hole 15 of the fuse puller 10 in a depth direction. On this account, the support 30 holds the fuse puller 10 in such a manner that the support portion 32 abuts with a lower side of the mounting hole 15 of the fuse puller 10 and the engagement portion 31 abuts with an upper side of the mounting hole 15 of the fuse puller 10. The engagement portion 31 has an edge portion 31a which is provided in a central part of the engagement portion 31 in the up-down direction and at which the outside diameter of the arc is largest, and the edge portion 31a is combined with inclined surfaces 31b, 31c continuing therefrom in the up-down direction so as to form a curve profile. In other words, the engagement portion 31 is configured such that an engagement overhanging part from the support 30 is formed in a curve profile. Since the engagement portion 31 is formed in such a curve profile including the edge portion 31a, engagement and disengagement of the fuse puller 10 with respect to the engagement portion 31 can be smoothly performed at the time of attachment and detachment of the fuse puller 10. Accordingly, when the fuse puller 10 is detached from the fuse-puller holding portion, the predetermined position 12b of the tip end 12 serves as a point of effort, and a fulcrum is placed at the rear end 11, so that the engagement portion 31 serves as a point of load.

Further, a tip of the support 30 has a shape smaller than a shape of the opening of the mounting hole 15 of the fuse puller 10. Roughly speaking, an outside diameter of the tip of the support 30 is smaller than an inside diameter of the arc of the mounting hole 15. Hereby, when the fuse puller 10 is attached to the support 30, the mounting hole 15 is easily passed through the support 30. This also allows the support 30 to improve an attachment/detachment property of the fuse puller 10.

Meanwhile, as illustrated in FIG. 1, in the present embodiment, the fuse-puller holding portion includes a rib portion 50 serving as the fulcrum, on a side opposite to the tip-end support portion 40 across the support 30. The rib portion 50 is formed so as to project from the mounting surface 22 in a wall shape, and is integrated with the cover portion 21 of the electrical connection box 20, as well as the support 30 and the tip-end support portion 40. More specifically, the rib portion 50 projects from a part of the mounting surface 22. The part of the mounting surface 22 is a surface opposed to the fuse puller 10 and a surface distanced from the base end of the support 30. Further, the rib portion 50 abuts with a lower side of the fuse puller 10 at least at the time when the fuse puller 10 is disengaged from the engagement portion 31. Since the rib portion 50 is formed integrally, it is possible to restrain an increase of a cost for forming the rib portion 50 and to restrain a complicated manufacturing process.

More specifically, the rib portion 50 is provided at a position opposed to the rear end 11 of the fuse puller 10 attached to the support 30 and a position distanced from the support 30 as much as possible. Further, the rib portion 50 is formed with a height that allows the rib portion 50 to abut with the rear end 11 of the fuse puller 10 opposed thereto, or with a height lower than that. Further, the rib portion 50 has a predetermined thickness in a direction directed toward the support 30, and has a predetermined width in a direction perpendicular to the thickness direction and parallel with the mounting surface 22. The rib portion 50 has a rigidity that prevents the rib portion 50 from deforming even if a downward force F2 is applied thereto. The downward force F2 is generated in the rear end 11 with the engagement portion 31 of the support 30 as a fulcrum at the time when a detachment force is applied to a tip-end-side 12 of the fuse puller 10. That is, the rib portion 50 has a thickness and a width for a shape that does not deform even if the downward force is applied thereto. Further, the predetermined width has a length that allows the rib portion 50 to be opposed to both of the two clip pieces 13A, 13B in the rear end 11.

Based on the foregoing, the rib portion 50 is provided at a position on an opposite side, across the support 30, to the predetermined position 12b of the fuse puller 10 extending from the support 30, and is provided as a fulcrum with the engagement portion 31 as a point of load at the time when the predetermined position 12b of the fuse puller 10 is assumed a point of effort. Further, it is preferable that the rib portion 50 be provided at a position at which a distance between the rib portion 50 and the engagement portion 31 serving as the point of load is not more than a distance between the predetermined position 12b serving as the point of effort and the engagement portion 31 serving as the point of load. By the law of the lever, it is possible to reduce a force to be applied to the point of effort as the distance between engagement portion 31 and the predetermined position 12b becomes longer than the distance between the rib portion 50 and the engagement portion 31, so that the fuse puller 10 is easily detached.

With reference to FIG. 4, the following describes an operation of such a rib portion 50. As illustrated in FIG. 4, when a detachment force F1, which is an upward force, is applied to the predetermined position 12b in the fuse puller 10 held by the fuse-puller holding portion, a downward force F2 is first generated in the rear end 11 with the engagement portion 31 of the support 30 as a fulcrum. The engagement portion 31 of the support 30 restricts an upward movement of the fuse puller 10.

Figure 5:
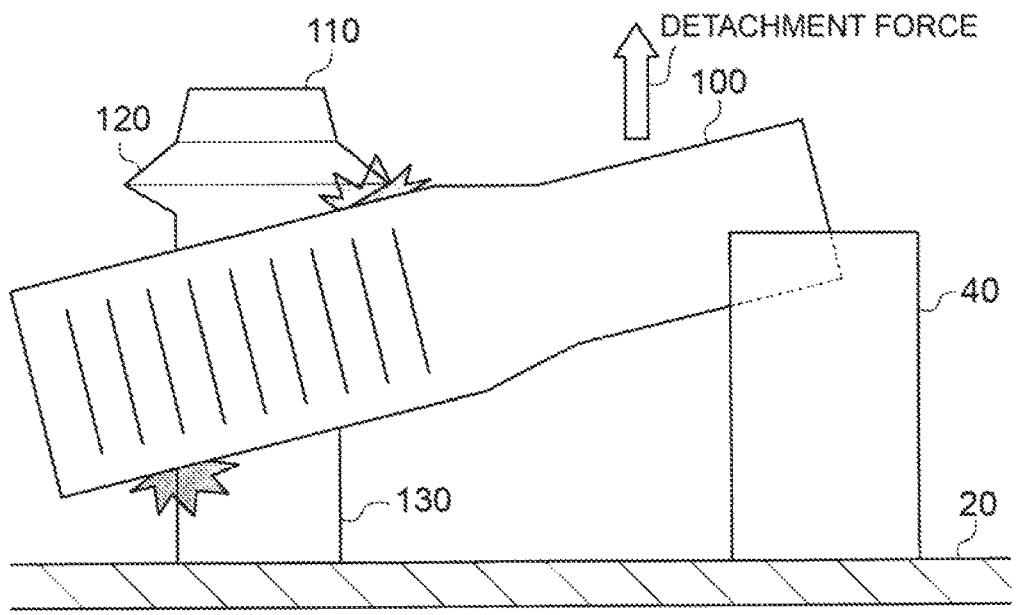
FIG. 5 is a side view schematically illustrating one aspect of detachment of a fuse puller in a fuse-puller holding structure in the related art.
Figure 6:
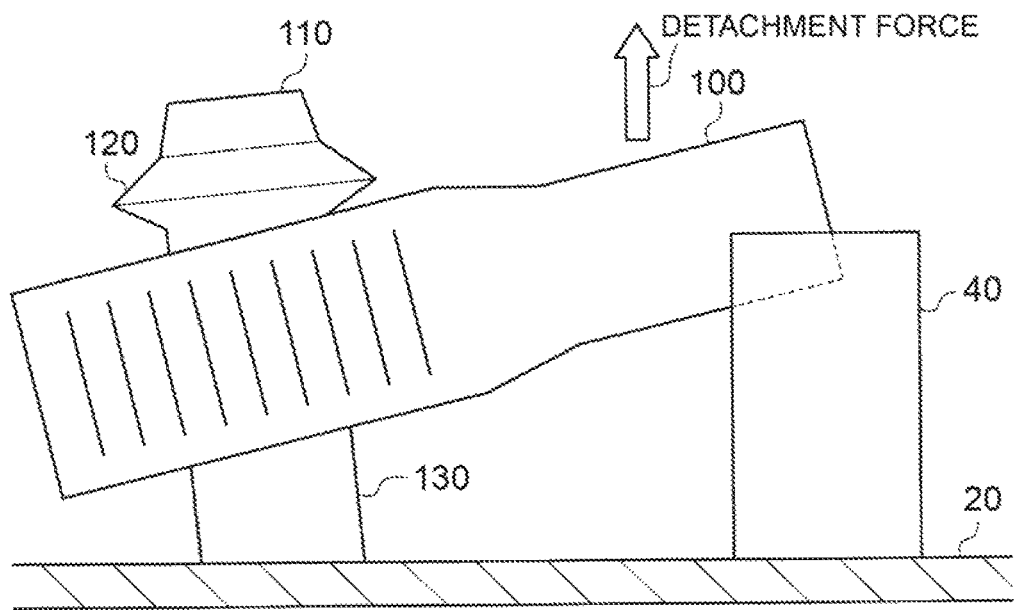
FIG. 6 is a side view schematically illustrating another aspect of detachment of a fuse puller in a fuse-puller holding structure in the related art.

In a case where the rib portion 50 is not provided as illustrated in FIGS. 5 and 6, for example, the downward force F2 thus generated moves the rear end 11 downward. Further, when the rear end 11 moves downward, the detachment force F1 applied to the tip end 12 is not transmitted as a force to move the mounting hole 15 upward, or a loss occurs in the transmission so that an acting force F3 to cause the fuse puller 10 to be pulled out of the engagement portion 31 of the support 30 decreases. This may make it difficult to detach the fuse puller 10 from the engagement portion 31 and may require a large force.

In this regard, in the present referred embodiment, a downward movement of the rear end 11 is restricted by the rib portion 50. Since the rib portion 50 functions as a fulcrum in the so-called the law of the lever, the detachment force F1 transmits a large upward force to the mounting hole 15 with the rib portion 50 as a fulcrum. That is, the engagement portion 31 of the support 30 serves as a point of load based on the detachment force F1, so that a large acting force F3 is applied to the engagement portion 31. Hereby, the mounting hole 15 of the fuse puller 10 pushes back the inclined surface 31c of the support 30 and passes through the engagement portion 31. Further, due to the law of the lever, the acting force F3 necessary to detach the fuse puller 10 from the engagement portion 31 of the support 30 can be obtained by the detachment force F1 smaller than the acting force F3. For example, the inventor found the following fact: in a structure that is provided with no rib portion 50 and requires a detachment force of approximately 100 [N] at the time when the fuse puller is detached, if the rib portion 50 is provided therein, the detachment force can be decreased to approximately 25 [N].

When the fuse puller 10 starts to move upward due to the acting force F3, the mounting hole 15 pushes back a surface including the inclined surface 31c of the engagement portion 31, so that an upper part of the support 30 is elastically deformed so that the gap between the first attachment piece 30A and the second attachment piece 30B is narrowed. When the gap is narrowed by the elastic deformation of the upper part of the support 30, the outer peripheral shape formed by the engagement portion 31 is also reduced just by the narrowed gap. As indicated by an alternate long and two short dashes line in FIG. 4, as the outer peripheral shape of the engagement portion 31 becomes smaller than an inner peripheral shape of the mounting hole 15, the mounting hole 15 can come through the engagement portion 31. Subsequently, the fuse puller 10 is detached from the support 30 such that a lower side of the mounting hole 15 passes through the engagement portion 31.

In the meantime, when the acting force F3 is applied to the fuse puller 10 from the engagement portion 31, the fuse puller 10 is inclined such that the tip end 12 becomes higher than the rear end 11. Accordingly, the acting force F3 is first applied to a tip-end-support-portion 40 side of the engagement portion 31 intensively. This results in that a strong force is applied to the tip-end-support-portion-40 side of the engagement portion 31, so that a tip-end-12 side of the mounting hole 15 can easily pass through the engagement portion 31. When the tip-end-12 side of the mounting hole 15 passes therethrough, a position to which the acting force F3 is applied moves sequentially from the tip-end-support-portion-40 side toward a rib-portion-50 side of the engagement portion 31 such that the acting force F3 is applied to each corresponding part intensively. Hereby, the each corresponding part is also pulled out from the mounting hole 15 sequentially. That is, since the mounting hole 15 passes through the engagement portion 31 with the fuse puller 10 being inclined, the acting force F3 does not dispersedly act on the whole engagement portion 31 provided generally in parallel with the upper side of the fuse puller 10, but the acting force F3 sequentially acts on parts of the engagement portion 31, so that the detachment can be easily performed.

Further, the engagement portion 31 is formed in a curve profile by the inclined surface 31c, the edge portion 31a, and the inclined surface 31b in a direction in which the support 30 extends. Accordingly, it is possible to restrain such an event that the mounting hole 15 is caught by the engagement portion 31, the mounting hole 15 abuts with the engagement portion 31 with a high frictional force, or the mounting hole 15 unexpectedly engages with the engagement portion 31. This allows the mounting hole 15 to smoothly pass through the engagement portion 31.

As described above, according to the fuse-puller holding structure of the present embodiment, since the rib portion 50 is provided, the fuse puller 10 can be held by the support 30 with an appropriate strength, and also can be smoothly pulled out from the support 30.

As described above, according to the fuse-puller holding structure of the present embodiment, it is possible to obtain the following effects. (1) The fuse puller 10 attached to the support 30 of the related art is configured such that a side (the tip-end-12 side) extending long from the support 30 is raised at the time of detachment, but when the fuse puller 10 is raised at a position distanced from the support 30, the support 30 may be broken such that the support 30 is inclined and deformed as described above. In this regard, according to the present embodiment, even if the fuse puller 10 is raised at the predetermined position 12b distanced from the support 30, the engagement portion 31 serves as a point of load along with the raising and the rear end 11 inclined downward abuts with the rib portion 50 serving as a fulcrum. Hereby, the inclination of the support 30 is restrained. Further, since a point of effort and a fulcrum are placed so as to sandwich a point of load, the law of the lever is applied. Because of this, preferably if a distance between the fulcrum and the point of load is set to be not more than a distance between the point of load and the point of effort, the fuse puller 10 is disengaged with a force smaller than the engagement between the engagement portion 31 as the point of load and the fuse puller 10. Hereby, the fuse puller 10 can be held with an appropriate strength and also can be smoothly pulled out from the support 30. Note that, in a state where the fuse puller 10 is attached to the cover portion 21, the rib portion 50 may abut with the fuse puller 10, or may not abut with the fuse puller 10.

(2) When the tip end 12 of the fuse puller 10 is raised, the rib portion 50 restrains the rear end 11 from being lowered with the support 30 as a fulcrum, so that inclination of the fuse puller 10 and the support 30 is restrained.

(3) Since the engagement portion 31 is extended from a tip-end-12 side of the fuse puller 10 to a rear-end-11 side thereof, when the fuse puller 10 is raised, a force is sequentially applied to the engagement portion 31 from the tip-end-12 side to the rear-end-11 side intensively, thereby resulting in that detachment from the engagement portion 31 is performed more smoothly.

(4) By placing the fuse puller 10 in the electrical connection box 20 in which a fuse is used, usableness is increased. Further, the support 30 and the rib portion 50 are formed integrally with the electrical connection box 20, so that the support 30 and the rib portion 50 can be provided easily with a low cost. In the meantime, if the support 30 is broken at the time of detachment of the fuse puller 10, its replacement is difficult. According to the present embodiment, the breakage of the support 30 itself can be restrained.

(5) The fuse puller 10 abuts with the rib portion 50 in a state where the fuse puller 10 is attached. Accordingly, a stability of holding of the fuse puller 10 attached to the support 30 in the electrical connection box 20 provided in the vehicle is further improved.

(6) Since the engagement portion 31 is formed in a curve profile in a direction in which the fuse puller 10 is attached and detached, engagement and disengagement of the fuse puller 10 with respect to the engagement portion 31 can be smoothly performed.

(Other Embodiments) Note that the above embodiment can be performed in the following manner. In the above embodiment, as an overhanging length (a projecting length) of the edge portion 31a of the engagement portion 31 with respect to the surface of the support 30, any length can be selected within a range where the outer peripheral shape at the time when the engagement portion 31 is pushed back becomes smaller than the inner peripheral shape of the mounting hole 15.

The above embodiment exemplifies a case where the cut in the support 30 is provided along a direction toward the tip-end support portion 40. Alternatively, the cut may be provided not along the direction toward the tip-end support portion 40, but along a direction perpendicular to the direction toward the tip-end support portion. Even with this configuration, a strong acting force acts on the engagement portion of the support because the rib portion is provided, thereby making it possible to easily detach the fuse puller from the support.

The above embodiment exemplifies a case where the cut in the support 30 is provided consecutively from the base end of the support 30 to the tip end thereof. Alternatively, as long as the cut is formed in a shape that can reduce the outer peripheral shape of the support at the time when the engagement portion is pushed back, the cut may be provided consecutively from the middle of the support to the tip end thereof. Further, a force required to push back the engagement portion, that is, a retentive force of the fuse puller by the engagement portion can be decreased according to a length from an upper part of the cut. Accordingly, the length from the upper part of the cut may be adjusted so that the retentive force of the fuse puller becomes appropriate.

The above embodiment exemplifies a case where the engagement portion 31 including the edge portion 31a has a curve profile in the up-down direction. Alternatively, the edge portion may be formed in an angular shape. Even in such a shape, the mounting hole easily passes through the engagement portion because the rib portion is provided.

The above embodiment exemplifies a case where the rib portion 50 has a single-wall shape projecting upward from the mounting surface 22. Alternatively, the rib portion may be constituted by a plurality of walls or poles, provided that the rib portion can be opposed to the two clip pieces 13A, 13B.

The above embodiment exemplifies a case where the rib portion 50 is opposed to both of the two clip pieces 13A, 13B. Alternatively, the rib portion 50 may be provided in such a manner that the rib portion 50 is opposed to only either one of the two clip pieces, provided that the rib portion 50 can resist a downward force.

The above embodiment exemplifies a case where the rib portion 50 is formed integrally with the electrical connection box 20. Alternatively, if the rib portion is provided in the electrical connection box, the rib portion may not be formed integrally, but may be attached externally such that another component is fitted, joined, welded, or screwed. This applies to the support 30 and the tip-end support portion 40.

The above embodiment exemplifies a case where the edge portion 31a of the engagement portion 31 has a largest outer circumference, that is, a so-called vertex. Alternatively, the edge portion may have a shape that has a so-called flat peripheral surface.

The above embodiment exemplifies a case where the engagement portion 31 is extended in a direction from the tip end 12 of the fuse puller 10 toward the rear end 11 thereof. Alternatively, the engagement portion may be divided into several parts in the same direction as above, or may be constituted by one or more projections.

The above embodiment exemplifies a case where the fuse puller 10 engages a fuse with the tip end 12. Alternatively, the fuse may be engaged with the rear end. Hereby, the fuse puller is easily detached regardless of a direction in which the fuse of the fuse puller is engaged.

The above embodiment exemplifies a case where the electrical connection box 20 is provided in the automobile. Alternatively, the electrical connection box may be provided in a vehicle except the automobile. The above embodiment exemplifies a case where the fuse-puller holding portion is provided on an inner side of the cover portion 21 of the electrical connection box 20. Alternatively, if the fuse puller is held appropriately, the fuse-puller holding portion may be provided on an outer side of the cover portion, or may be provided on an inner side or an outer side of the body portion of the electrical connection box. Furthermore, the fuse-puller holding portion may be provided on a surface of another resin member provided separately from the electrical connection box.

What is claimed is:
1. A fuse-puller holding structure in which a fuse puller used for detachment of a fuse is held by a fuse-puller holding object provided in a vehicle, the fuse-puller holding structure comprising:
  an engagement portion provided in a tip end of a support, the tip end being provided on a side opposite to a base end of the support, the base end being provided on a mounting surface of the fuse-puller holding object, the engagement portion being configured to be engaged with the fuse puller in a state where the fuse puller is attached to the fuse-puller holding object, so as to restrain the fuse puller from detaching from the fuse-puller holding object; and
  a rib portion projecting from a part of the mounting surface of the fuse-puller holding object, the part of the mounting surface being a surface opposed to the fuse puller and the part of the mounting surface being a surface distanced from the base end of the support,
  the rib portion being provided at a position opposite to a predetermined position of the fuse puller across the support such that the rib portion serves as a fulcrum and the engagement portion serves as a point of load at a time when the predetermined position of the fuse puller serves as a point of effort, and the rib portion being provided at a position at which a distance between the point of load and the rib portion is not more than a distance between the point of effort and the point of load,
wherein the fuse puller is held by the support so as to be distanced from the mounting surface of the fuse-puller holding object.
2. The fuse-puller holding structure according to claim 1, wherein
  the fuse puller is configured such that an end portion to be engaged with the fuse is a tip end and an end portion opposite to the tip end is a rear end, and the rib portion is provided at a position opposed to a position of the fuse puller, the position of the rib portion being closer to the rear end of the fuse puller than the support is.
3. The fuse-puller holding structure according to claim 2, wherein the engagement portion is provided in the tip end of the support so as to be extended in parallel with a direction from a tip-end side of the fuse puller toward a rear-end side of the fuse puller.

4. The fuse-puller holding structure according to claim 1, wherein:
   the fuse-puller holding object is an electrical connection box made of resin; and
   the support and the rib portion are formed integrally with the electrical connection box.

5. The fuse-puller holding structure according to claim 1, wherein
   the rib portion is provided so as to abut with the fuse puller attached to the support.

6. The fuse-puller holding structure according to claim 1, wherein
   the engagement portion is configured such that an engagement overhanging part from the support is formed in a curve profile.

7. The fuse-puller holding structure according to claim 1, wherein
   the support is formed in a generally cylindrical shape extended in an up-down direction, which is a vertical direction with respect to the mounting surface;
   the support has a cut extending in the up-down direction so as to divide the support into a first mounting portion and a second mounting portion along a direction from a tip-end support portion side toward its opposite side, the tip-end support portion being provided on the mounting surface of the fuse-puller holding object so as to be placed at a position at which the tip-end side of the fuse puller is placed; and
   the cut is provided consecutively from the base end of the support to the tip end of the support in the up-down direction.

* * * * *